United States Patent [19]

Brosh

[11] 4,253,079
[45] Feb. 24, 1981

[54] DISPLACEMENT TRANSDUCERS EMPLOYING PRINTED COIL STRUCTURES

[76] Inventor: Amnon Brosh, 16 Sunnyside Dr., Montvale, N.J. 07645

[21] Appl. No.: 28,981

[22] Filed: Apr. 11, 1979

[51] Int. Cl.³ .............................................. H01F 21/06
[52] U.S. Cl. .................................. 336/84 C; 336/136; 336/179; 336/183; 336/200
[58] Field of Search ...................... 336/84 C, 136, 183, 336/200, 232, 179, 73, 74, 75, 83, 90

[56] References Cited

U.S. PATENT DOCUMENTS

| | | | |
|---|---|---|---|
| 3,484,697 | 12/1969 | Abend | 336/200 X |
| 3,979,706 | 9/1976 | Jennings | 336/200 X |

FOREIGN PATENT DOCUMENTS 1180923  2/1970  United Kingdom ...................... 336/83

*Primary Examiner*—Thomas J. Kozma
*Attorney, Agent, or Firm*—Arthur L. Plevy

[57] ABSTRACT

There is disclosed a displacement transducer which comprises a plurality of planar circuit boards, each having a coaxial central aperture. Each of said boards having disposed thereon at least one spiral conductive structure which manifests a predetermined coil. The structure is oriented about the aperture and has a first and second terminal. The boards are positioned in a stacked array with each of said boards separated one from the other and with said central apertures aligned to form a central coaxial cavity. Leads are coupled to the first and second terminals of said boards for connecting certain ones in a primary winding configuration and others in at least two secondary configurations. A magnetic core adapted for insertion into said cavity varies the coupling between the primary and secondary windings according to the depth of insertion of said core within said cavity.

22 Claims, 12 Drawing Figures

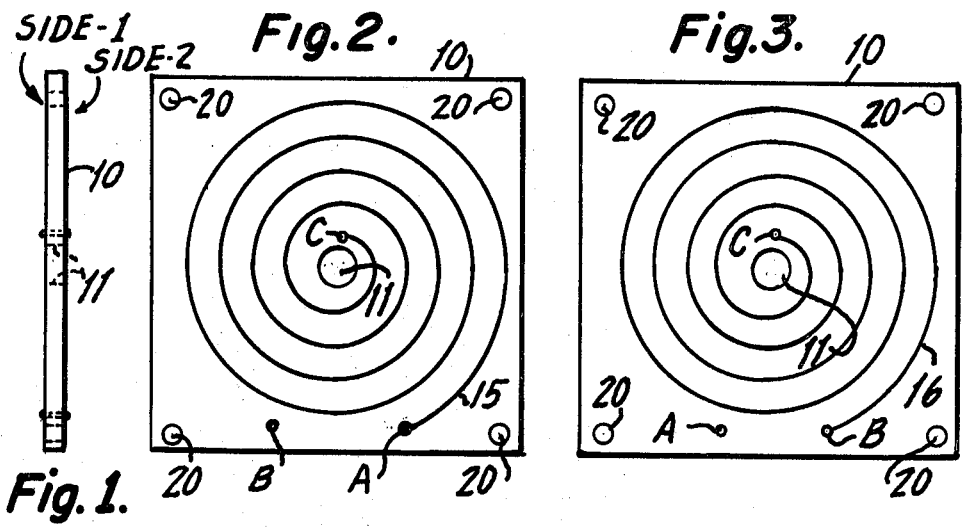
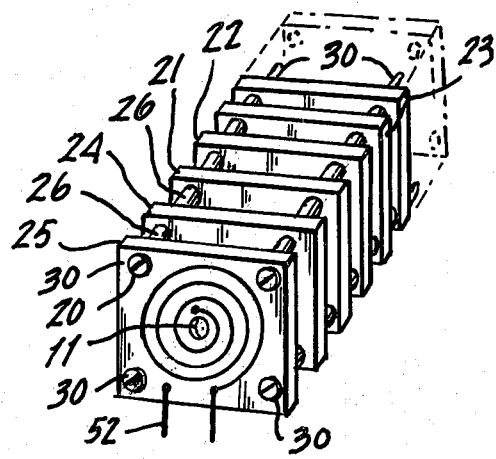
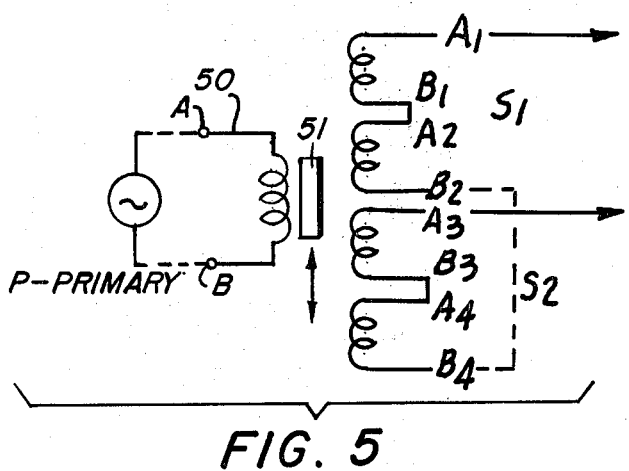
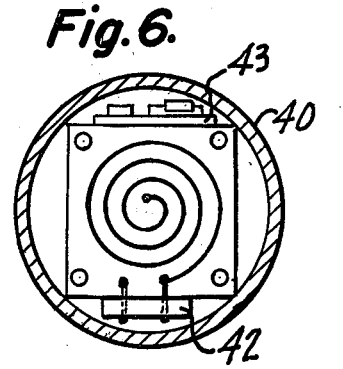

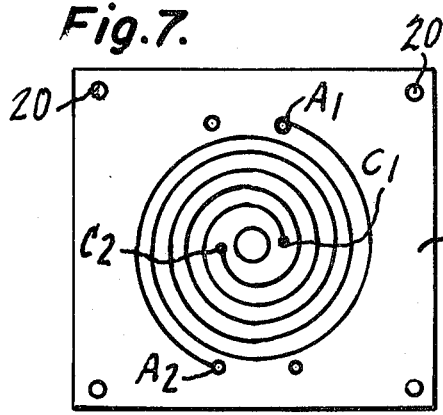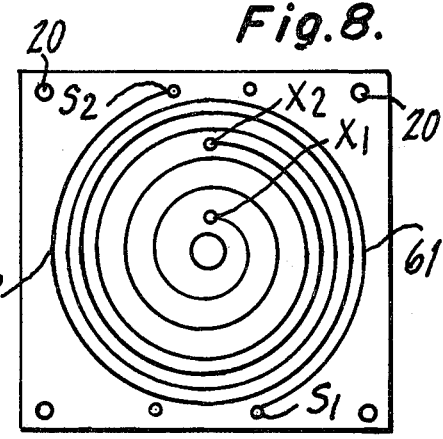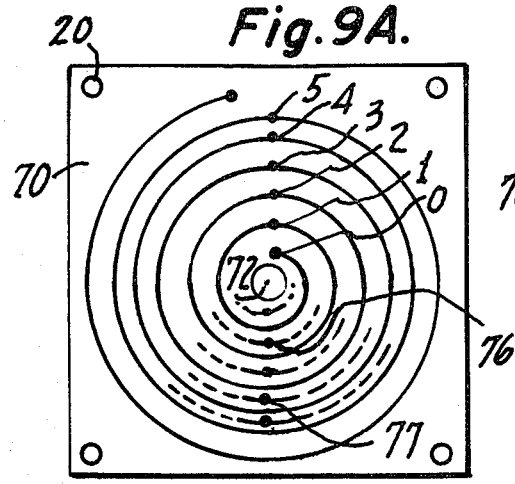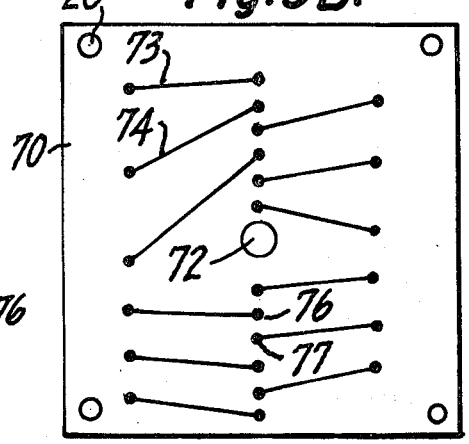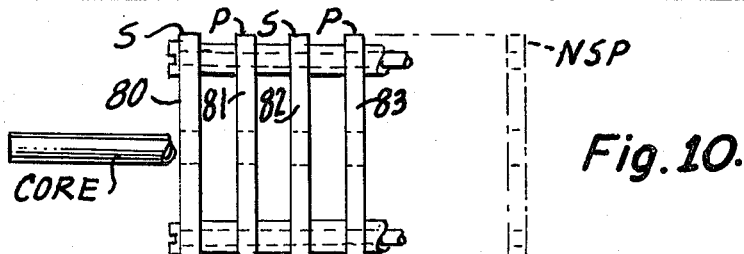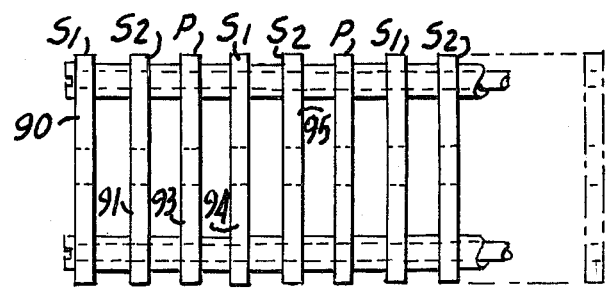

DISPLACEMENT TRANSDUCERS EMPLOYING PRINTED COIL STRUCTURES

BACKGROUND OF INVENTION

This invention relates to displacement transducers and more particularly to a variable differential transformer transducer employing printed coil configurations.

The prior art is replete with a number of transducer elements which operate to convert from one physical quantity to another. For example, such transducers can operate to convert linear motion measurement into an electrical signal and so on.

A particular transducer is sometimes referred to as a linear variable differential transformer (LVDT). The LVDT is a displacement transducer and it basically produces an electrical output which is proportional to the displacement or movement of a movable core associated with the transducer. Such transducers employ a primary winding to which an AC voltage is applied. Two secondary windings are symetrically spaced from the primary and are usually connected externally in series opposition. As the core moves, the coupling between the primary and the secondary changes and hence, the voltage which is induced in the secondary also changes. In such devices, there is no physical contact between the coil and the core and hence, the devices are capable of operation for extremely long periods as they do not wear out. Such devices have been employed in various forms for decades and are well known.

As indicated above, the present transducers employ multiple coils which are arranged as secondary and primary windings. In order to fabricate such devices, bobbins are employed. A bobbin is a relatively complex machine part and different length and shape bobbins are required to accommodate different types of transducers. As such, the LVDT can be employed to measure relatively small displacements and such devices are sometimes referred to as short travel devices.

In other embodiments, the LVDT is used to measure a large displacement and such devices are referred to as long travel devices. In any event, a long travel device often employs a large number of bobbins in order to accommodate the required displacement. Each bobbin is then wound to accommodate a suitable coil and the winding of such bobbins is a relatively time consuming operation. Once the bobbins are wound, the individual wires in regard to each coil must be connected together and provisions must be provided for external leads or terminals. Thus, in the fabrication of multiple coil units, the wiring and construction of such LVDTs is quite time consuming. This expense, of course, increases as the length of the unit increases and hence, long travel transducers are extremely expensive.

It is an object of the present invention to provide an improved variable differential transformer device which employs printed coil configurations. The individual coil structure can be coupled together rapidly and efficiently to provide various transducer configurations with a minimum of effort. These configurations, as will be described, produce completely unexpected and unanticipated operating characteristics compared to present commercially available devices and with these characteristics there is also a substantial reduction in assembly and labor costs.

BRIEF DESCRIPTION OF THE PREFERRED EMBODIMENT

A displacement transducer comprises a plurality of planar wafers each having deposited on a surface thereof, at least one spiral conductive structure manifesting a coil with said structure oriented about said aperture, each of said wafers having a first and second terminal, means for positioning said wafers in a stacked array with each of said wafers separated one from the other, with said central apertures aligned to form a central coaxial cavity, means coupled to said first and second terminals of said wafers for connecting certain ones in a primary winding configuration and certain other ones in said plurality in at least two secondary winding configurations, a movable core adapted for insertion into said coaxial cavity for varying the coupling between said secondary and primary windings according to the depth of insertion of said core within said cavity.

BRIEF DESCRIPTION OF THE FIGURES

FIG. 1 is a side view of a circuit wafers according to this invention.

FIG. 2 is a top view.

FIG. 3 is a bottom view.

FIG. 4 is a perspective view of a plurality of circuit wafers coupled in a stacked array to form a displacement transducer.

FIG. 5 is a circuit schematic showing the circuit configuration of the transducer.

FIG. 6 is an end view of a transducer mounted in a suitable housing.

FIG. 7 is a top view of a bifilar coil arrangement.

FIG. 8 is a top view of a circuit wafer employing two coils useful in a tapered winding configuration.

FIGS. 9A and 9B are respectively a top and bottom view of a circuit board useful for selecting a predetermined inductance for use in a tapered winding configuration.

FIG. 10 is a side view of a particular transducer format.

FIG. 11 is a side view of an alternate transducer format according to this invention.

DETAILED DESCRIPTION OF THE INVENTION

Referring to FIG. 1, there is shown a side view of a thin wafer or plate which is fabricated from a suitable material used in the integrated circuit or printed circuit board art. As such, the wafer 10 is shown as being relatively square in the front configuration of FIG. 2. However, it is understood that other geometrical configurations could be employed as well. Essentially, the wafer may be fabricated from a glass filled epoxy or a ceramic material. It is understood that wafer materials are widely available and many types of suitable materials can be employed.

The concept of fabricating a coil or an inductor on a printed circuit board or wafer is well known in the art and there are many patents which show such structures employed on printed circuit boards. In any event, the use of the coil configuration as depicted in FIGS. 1–3 provides unexpected and unanticipated results when employed as a variable differential transducer.

Referring to FIG. 1, the wafer has a first and second side and has a central aperture 11 directed therethrough. The central aperture 11 is of a suitable diameter to accommodate a magnetic core or rod which is inserted through the aperture to effectuate the coupling between primary and secondary windings as will be further explained.

Referring to FIG. 2, a spiral conductor path 15 is formed upon the top surface of the wafer 10. Essentially, if printed circuit wafers are employed, the conductor path is copper and is fabricated thereon by conventional techniques. The coil starts from a first terminal A. The conductor configuration 15 then assumes a spiral path and terminates relatively near the central aperture 11 in a feed through terminal designated as C.

On the other side of the wafer as shown in FIG. 3, an additional coil is formed between terminal C and terminal B. The additional coil may have the same number of turns as the coil of FIG. 2 and also consists of a suitable conductor path 16 formed between terminal C and terminal B. In this manner, one achieves a complete coil using both the top and bottom surfaces of the wafer 10.

Terminal A represents one end of the coil, while terminal B designates the other end of the coil. Terminal C is the center of the coil if the number of turns on both surfaces are the same. As one can see by viewing FIGS. 2 and 3, a complete coil is formed on the top and bottom sides with all the windings of the coil or turns directed in the counterclockwise direction. The wafer has four holes as 20 located in each corner.

Shown in FIG. 4 is a stack arrangement with a plurality of wafer boards as 10 coupled togeter to form a linear variable displacement transformer. A central wafer 21 is of the same configuration as that shown in FIGS. 1–3. Located to the right of wafer 21 are wafers 22 and 23. Wafers 22 and 23 form one secondary of the LVDT device. To the left of the primary wafer are wafers 24 and 25 which form the other secondary of the LVDT device. It is, of course, noted that the central aperture 11 of each wafer are in alignment. The wafers are coupled a predetermined distance one from the other via spacers 26. The spacer 26 may be fabricated from an insulator material such as fiberglass, paper and so on.

A screw 30 is inserted through each aperture 20 of the wafers to couple the entire assembly together as shown in FIG. 4. FIG. 5 depicts a typical circuit diagram of such a configuration.

The primary coil 50 of FIG. 5 represents the spiral inductor configuration formed on wafer 21. Wafers 22 and 23 are connected in series by connecting the B terminal of each wafer to the A terminal of the adjacent wafer, thus forming a first secondary winding designated as $S_1$. In a similar manner, the coils on wafers 24 and 25 are also joined together in series to form an identical secondary winding designates as $S_2$. A magnetic core such as 51 when inserted via the central aperture 11, will vary the coupling between the primary and the secondary windings according to the position of the core within the coaxial central aperture 11.

It is, of course, seen from FIG. 4 that the number of coils or wafer boards 10 can be easily extended to obtain long travel units. In this manner, the thickness of the printed circuit board can also vary to accommodate the necessary ranges.

In the configuration shown in FIG. 4, the central wafer 21 constitutes the primary winding of the LVDT and is bounded by the secondary winding $S_1$ consisting of boards 24 and 25. The format or selection of primary and seconary boards can vary greatly and can be arranged in a variety of ways. Hence, one can employ a primary board, followed by a seconary followed by a primary or multiples of such arrangements.

As one can see from FIGS. 4 and 5, the interconnection of the coil terminals as A and B is very simply implemented and extremely easy to accommodate. In fact, as shown in FIG. 4, pins such as 52 and 53 can be coupled to the A and B terminals and these pins can interface with a prewired printed circuit board which would automatically make the necessary connections in regard to the stacking arrangement. As one can see, there are a number of ways of implementing such connections which substantially reduce the fabrication and assembly time associated with such transducers.

A further simplification of the assembly can be accommodated by using multilayer printed circuit techniques. In these techniques, several layers of printed circuit boards are coupled together in a stacked array and interconnections are accommodated by means of plated through holes. The spacing between the coil structures on various layers can vary according to the thickness of the board.

Referring to FIG. 6, the entire assembly can be positioned within a metal cylindrical housing 40 as shown and hence, the wafer boards and the coil assemblies are shielded and protected from the environment. Also shown located within the housing are additional components such as 42 and 43 which can be electronic components such as an oscillator and rectifier in order to provide DC operation for the LVDT device. By using integrated circuit components, one can therefore incorporate all the electronics necessary within the housing 40 and in the space, as shown in FIG. 6, above the side walls of the stacked assembly.

From a mechanical point of view, the configuration depicted has many advantages.

1. The modular construction provides great versatility in that the number of wafer boards can be stacked simply and efficiently to provide long travel devices as easily as short travel devices. There are no bobbins required and hence, both bobbins and the winding of the bobbins are eliminated. This therefore enables a manufacturer to produce a displacement transducer without the need for special winding machines and other extremely expensive equipment.

2. The interconnections between the wafer boards can be simply and efficiently implemented by means of additional printed circuit boards used for interconnecting the terminals or by direct wiring of the terminals. This also substantially reduces labor and fabrication time.

3. As indicated, the wafer assembly shown in FIGS. 1–3 is a basic building block from which an entire transducer can be fabricated. As will be explained, this enables a manufacturer to implement a wide product line without the necessity of expensive tooling and different configurations to implement different transducer devices.

The unit, as indicated, also possesses some extreme advantages in regard to electrical operating characteristics. In the wafer assembly depicted, the capacitive coupling between the windings in the same coil and between the different coils or wafer boards in the same array is much smaller than that existing in bobbin type or prior art devices. This enables reliable operation at much higher frequencies than implemented with prior art devices. Since one can distribute the primary and seconary wafers with a minimum of effort, the final product exhibits improved linearity and performance in regard to the prior art devices.

Another extreme advantage can be had by referring to FIG. 4. In the configuration shown, wafer 21 is a primary board. A simple transducer will employ wafer 21 as a primary board, with wafer 23 as a first secondary and wafer 25 as another secondary. This is a simple structure with a central primary and two adjacent secondary wafers. The wafers 22 and 24 are now copper plated boards or electrostatic shields. In this manner, the primary wafer 21 is electrostatically shielded from each secondary wafer as 23 and 25. Thus, the configuration allows one to provide for electrostatic shielding in a simple and reliable manner. The shield wafers 22 and 24 are relatively square pieces of an electrostatic shielding material having a central aperture and mounting holes and serves to isolate and present a shield between the primary and secondary coils.

A major and unexpected result of such devices is that the air null is extremely low and can be adjusted in such a device so that it is practically, for all purposes, negligible. The air null is the voltage output reading of the coil assembly when the primary wafers are excited by or coupled to an AC source and the secondary coils are connected in series opposing. A low air null is indicative of good symmetry and low capacity. A low null results in an improved transducers operation.

The null in an LVDT device is a condition of balance which results in a minimum absolute value of output when the core is positioned between the primary and secondary windings at its quiescent condition. To obtain a low null in a prior art device was and still is a time consuming operation. Any imbalance in the primary and secondary windings results in an undesired signal being produced due to the fact that the induced voltages in the secondaries were not the same. This imbalance could be caused by many factors such as assymetry in the turns on the bobbin. These factors as well as other factors concerning mechanical position and so on necessitate manual balancing of such structures.

Hence, in the prior art devices, one would have to move or reposition wires in order to achieve a low null. In the device depicted in FIG. 4, low nulls can be easily implemented merely by varying the space dimension between adjacent boards and hence, one can obtain nulls extremely rapidly and of lower magnitudes than typical nulls provided in the prior art devices. The symmetry of the coils also affords a great improvement in obtaining a low null.

A further problem that the structure of FIG. 4 solves is variation of null position in regard to temperature. In prior art devices, the bobbins as well as the coil windings normally exhibit different coefficients of expansion with temperature than the metal housings which contain the units. This problem was extremely severe in regard to prior art LVDTs resulting in relatively large thermal zero shifts.

In the device depicted in FIG. 4, the screws 30 couple the wafers together and extend from the front to the rear of the entire assembly. These screws are fabricated from a material which has the same coefficient of thermal expansion as the housing and hence, the transducer depicted in FIG. 4 has much greater temperature stability of null than prior art devices. This is due to the fact that the screws will expand and contract in a similar manner as the housing 40. This thus tends to maintain the relative position between all components with temperature over a wide range and hence, the unit is capable of operating over much larger temperature ranges than any of the prior art devices due to the maintenance of a good null specification.

The thermal stability and nulling capability of the unit provides a transducer structure which apart from its apparent mechanical advantages, is superior in electrical operation and performance than the prior art devices. Furthermore, due to the decrease in capacitance, the units can be operated at much higher frequencies than the prior art devices and frequencies in excess of 25 KHz are readily obtainable resulting in greater efficiency, higher frequency response and improved thermal behavior.

Referring to FIG. 7, there is shown a coil arrangement which is effective in providing a symmetrical structure, while still maintaining a low coupling capacitance between the windings. In prior art LVDTs, one attempt used to improve symmetry was to employ bifilar windings. In any event, these windings serve to improve the symmetry of the device but resuluted in extremely large capacitance and hence, reduced the operating efficiency and frequency of the unit.

Referring to FIG. 7, a first coil starting from terminal $A_1$ is deposited on a wafer 60. Coil $A_1$ spirals inwardly to terminal $C_1$. Terminal $C_1$ is a feed through terminal leading to an additional coil fabricated on the other side of the wafer 60 as, for example, shown in FIGS. 2 and 3. A second coil starts from terminal $A_2$ and spirals towards feed through terminal $C_2$ also leading to the other side of wafer 60.

As can be seen, the coils are coaxial and separate. Thus, as shown in FIG. 7, two coils are placed on the same board and each coil is concentric with the other. Since the coils are fabricated on the same wafer 60 and are deposited employing the same techniques, they are relatively identical in magnitude, size and construction and hence, exhibit completely symmetrical operation. This further assures a complete balance when the coils are employed as a primary and secondary. Since the coils are spaced apart, their capacitance is small and hence, high frequency operation is easily obtained. Thus, as seen in FIG. 7, two or more coils can be emplaced on a single wafer by providing concentric paths.

Typical line widths which are available in printed circuit techniques can specify conductor widths for the coils of about ten mils with spacing between conductors of the same magnitude. In any event, one can employ photolithographic techniques in conjunction with insulative substrates such as glass, ceramic to achieve line widths of a few mils and hence, providing multiple coils on single wafers is a relatively easy task.

An extremely useful technique described in the prior art is contained in U.S. Pat. No. 3,054,976 entitled DIFFERENTIAL TRANSFORMER by J. Lipshutz issued on Sept. 18, 1972. This patent describes a tapered winding LVDT. Basically, in prior art devices, the long travel transducer became cumbersome and impractical as the length of travel increased. These devices became extremely long and expensive. The tapered device afforded an improvement in the ratio of the length of the transducer versus its linear stroke. In general, the length of an LVDT is greater than twice the useful linear stroke. For example, for a plus and minus one inch linear stroke, the length of a prior art device has to be more than four inches and normally in excess of five to six inches.

In the tapered LVDT, the length can be made to be only slightly greater than the linear stroke. The tapered windings provide a magnetic coupling path between the primary winding and both secondaries whenever the core is moved throughout the entire length of the coil form. The secondary coils are wound in a taper over one another and over the primary coil. This approach requires coil forms to be wound with multiple bobbins and such bobbins can be several inches long. The windings, as indicated, must be tapered and hence, present problems in fabrication and interwinding.

Referring to FIG. 8, there is shown a printed coil configuration or wafer which, when stacked, can provide the same advantages as a tapered transformer. Essentially, FIG. 8 shows a first coil 61 having a first terminal $S_1$. The coil is directed towards the terminal $X_1$ in a spiral configuration. Another coil 62 begins at terminal $S_2$ and is directed towards terminal $X_2$ in a spiral configuration.

It can be seen that coil $S_1$ has more turns than coil $S_2$ and hence, there is a definite relationship or ratio between the turns of $S_1$ and $S_2$. This ratio is also kept on the other side of the board or can be made as indicated in FIG. 8, as desired. In this manner, one can produce a gradually increasing inductance for $S_1$ wafers along the length of a transducer, while the inductance for the $S_2$ wafers can decrease to provide a linear taper across the entire length of the transducer. The turns ratio for the $S_1$ and $S_2$ coils can be adjusted and therefore varied in any manner desired by changing the position of $X_2$.

Referring to FIG. 9A, there is shown an alternate embodiment which enables one to employ the tapered winding effect in a printed circuit transducer. Deposited on the circuit board 70 is a spiral coil configuration 71. As noted previously, the coil configuration is directed about the central aperture 72. On the top side of the board, a series of feed throughs designated as 0,1,2,3,4, and 5 are present.

The back of the board is shown in FIG. 9B. Each of the terminals as 0–5 is then directed towards the edge of the board by means of a suitable conductor path as 73 and 74. In this manner, the manufacturer can select any terminal as 0–5 and therefore select a predetermined inductance for each wafer.

A second coil not shown for the sake of clarity can also be formed on wafer 70 starting from terminal 75 and five or more points such as 76 and 77 can also be brought out on the back side of wafer 70 to enable one to select another portion of the second coil to thereby provide desired secondary ratios.

Referring to FIG. 10, there is shown a side view of a transducer arrangement which employs stacked boards such as those shown in FIG. 8. In this manner, a first board 80 contains secondary windings $S_1$ and $S_2$ of a first ratio. The next board 81 is a primary board and consists, for example, of the board 10 as shown in FIG. 2. The next board 82 is another secondary board as in FIG. 8 having a different secondary ratio and this is followed by another wafer or board 83 of a primary configuration and so on. In this manner, the ratios of $S_1$ to $S_2$ are tapered or varied over the entire length of the transducer to thus enable one to achieve a better stroke to length ratio.

Referring to FIG. 11, there is shown a typical structure which can be employed with the configurations shown in FIG. 9. Thus, a first board 90 is a secondary board and one would select a terminal such as 0-5 for a first inductance. This would be followed by a second board 91 of the same configuration as board 90 and one would then select a different inductance. A primary board 93 is then accommodated.

The primary board 93 is again followed by another board 94 specifying a different coil size according to the structure shown in FIG. 9 which is followed by another board 95 of still a different coil selection. In this manner, a complete tapered structure is provided by the manufacturer selecting the appropriate terminals on the boards of FIG. 9 and connecting these terminals in series one to the other to provide the tapered winding.

As above indicated, the use of the tapered winding in conventional systems is usually confined to long travel LVDTs. The major reason for this is that multiple bobbin coils are required and hence, great lengths and fabrication times are necessary. In the above described approach, the printed circuit wafers are extremely thin and hence, one can employ the tapered winding concept for short travel devices.

Typical ceramic substrates which could be employed for wafers 60 and 70, for example, are about 0.01" thick and one can obtain flexible printed circuit wafers in thicknesses of between 0.001 to 0.002" thick. Hence, the printed circuit LVDT can be made much smaller for both short and long travel devices.

If one employs the tapered technique described above in a short travel device, one would obtain an extremely short device at a relatively low cost.

Based on the fact that one can accurately control the amount of windings and therefore the ratio between inductors in the secondary windings by the use of the techniques described above, one can therefore employ tapered structures which are not of the straight line variety. In this manner, if one employed the tapered effect in a short travel printed circuit transducer, the edge effect can be substantially reduced. The edge effect in an LVDT device occurs due to the core moving close to the end of the coil.

In such devices, a good portion of the magnetic flux is concentrated about the core with a certain portion of the flux extending well beyond the ends of the core. Hence, as the core moves away from the center of the structure, an increasing amount of flux is lost and does not couple to the secondary winding into which the core is moved. This results in a reduced voltage output from the device. The reduction in voltage output results in the deterioration of the linearity, thus greatly limiting the linear range of the device. In order to solve this problem, the prior art devices were made considerably longer than necessary to compensate for the edge effect. In certain other prior art techniques, one attempted to compensate for this effect by placing more windings on the secondary which was close to the edge of the device. The problem with this technique is that the impedance of the secondary varies as the core moves into the builtup section. The changing of impedance resulted in phase shifts and so on.

By employing the printed coil approach as indicated above, one can control the ratio between the two secondary windings while keeping this sum constant to form a taper which is not linear but which takes into account the voltage loss which would occur based on the edge effect. In this manner, the differential voltage is kept linear and the phase constant.

It is thus seen that the printed circuit stacked array format as described above has great advantages in the fabrication of displacement transducers. The techniques give the manufacturer great versatility in providing a large variety of transducers with varying and unique characteristics.

In regard to the embodiments shown in FIGS. 2 and 3 concerning the fabrication of the coils, a printed circuit board of the glass filled epoxy type was approximately 1.03" square with a central aperture of approximately 0.203". A coil was formed having a line width of about 0.020" and possessing eight turns on each side about the central aperture. Other configurations employed boards of 0.68" square with a central aperture of about 0.156". The boards were approximately 0.02" thick. Stacking such boards with such dimensions provided displacement transducers as shown in FIG. 4 which operate at frequencies in excess of 25 KHz with sufficient output and linearity. Use was made of a ferrite core which was inserted through the coaxial central aperture and the distance of penetration was linearly related to the coupling between the primary and secondary boards. The spacing between the boards was approximately 0.1" and could, of course, be varied by the use of different length spacers. As indicated, the spacers were insulated but a large metal screw was directed through the corner apertures 20 at each of the four corners of the board.

The use of the printed coil configurations enable one to stack or align such wafers in various paths such as along an arc or in a serpentine array to allow one to measure displacements which are not linear. By using ceramic wafers with fired thick or thin film technology, the printed coil wafer can operate at temperatures in excess of 800° F. Interconnections between the wafers are made by welding or thermocompression bonding and hence, high temperature operation is further enhanced. These devices operate in high nuclear radiation flux without degradation.

Many other modifications in regard to materials, coil structure and configuration should become obvious to those skilled in the art and such alternatives are deemed to be encompassed within the teachings of this specification and all such alternatives are deemed to be within the spirit and scope of the claims appended hereto.

I claim:

1. A displacement transducer comprising:
    (a) a plurality of wafers each having a central aperture, each of said wafers having positioned on a surface thereof, at least one spiral conductive structure manifesting a coil with said structure oriented about said aperture, each of said coils having a first and second terminals,
    (b) means for positioning said wafers in a stacked array with said coils separated one from the other with said central apertures aligned to form a central coaxial cavity,
    (c) means coupled to said first and second terminals of said wafers for connecting certain ones in a primary winding configuration and certain other ones in said plurality in at least two secondary winding configurations,
    (d) a movable core adapted for insertion into said coaxial cavity for varying the coupling between said secondary and primary windings according to the depth of insertion of said core within said cavity.

2. The displacement transducer according to claim 1 wherein each of said wafers has said spiral conductive structure on said first top surface and an additional spiral conductive structure on said bottom surface, with said structures being directed in the same orientation with respect to the face of a clock as both being clockwise or counterclockwise.

3. The displacement transducer according to claim 1 wherein each of said wafers is of a relatively square configuration with a smaller diameter aperture in each corner.

4. The displacement transducer according to claim 1 wherein said wafers are separated one from the other by insulative spacers of a predetermined length positioned between said wafers.

5. The displacement transducers according to claim 3 wherein said wafers are positioned in a stacked array by means of elongated rods inserted into each of said smaller apertures with spacers positioned about said rods and located between each of said wafers to provide said separation.

6. The displacement transducers according to claim 1 further including a metal housing having an internal hollow and means for positioning said stacked array within the hollow of said housing.

7. The displacement transducer according to claim 1 wherein said movable core is fabricated from a magnetic material.

8. The displacement transducer according to claim 1 wherein certain wafers in said plurality have a first and a second spiral conductive pattern located on said surface, said patterns being coaxial and of the same number of turns about said central aperture.

9. The displacement transducer according to claim 1 wherein certain wafers in said plurality have a first and a second spiral conductive pattern located on said surface, with said patterns being coaxial and with said first pattern being of a different number of turns about said central aperture then said second pattern to thereby form two coils having a predetermined turns ratio with respect to one another.

10. The displacement transducer according to claim 9 wherein said certain wafers as coupled together via said terminals to form secondary windings selected according to said turns ratio.

11. The displacement transducer according to claim 1 wherein certain wafers in said plurality have a first spiral conductive pattern formed on a first surface of said board, a plurality of first terminals connected to said conductive pattern at preselected intervals to enable selection of any one of said first terminals manifesting a given inductance value to enable selection of said inductance value for at least one of said secondary windings.

12. The displacement transducer according to claim 10 wherein said plurality of stacked wafers includes a first one designated as a secondary wafer followed by a next one designated as a primary wafer, followed by a next one designated as a secondary wafer.

13. The displacement transducer according to claim 11 wherein said plurality of stacked boards includes a first wafer designated as a first secondary wafer, followed by a second wafer designated as a second secondary wafer, followed by a third wafer designated as a primary wafer, followed by a fourth wafer designated as a first secondary wafer, followed by a fifth wafer designated as a second secondary wafer, wherein said first and second secondary wafers have inductances selected according to a predetermined ratio to provide a tapered transducer.

14. The transducer according to claim 1 wherein the separation between adjacent wafers varies.

15. The transducer according to claim 1 further including means coupled to said terminals associated with said primary wafers for applying a source of AC potential thereto.

16. The transducer according to claim 15 wherein the frequency of said source is in excess of 25 KHz.

17. The transducer according to claim 11 wherein said terminals are feed through terminals and thus extend to the opposite surface of said wafer and connecting terminal means coupled to said terminals on said opposite surface to enable selection of said inductance value at said opposite surface.

18. The transducer according to claim 1 wherein certain of said wafers are fabricated from an insulator material with said conductive pattern formed from copper.

19. The transducer according to claim 1 wherein a number of said plurality of boards in a central location are designated as primary wafers, with a second number of wafers to the right designated as first secondary wafers and the remaining wafers to the left of said primary wafer designated as second secondary wafers.

20. The displacement transducer according to claim 5 wherein said elongated rods are fabricated from a material having a predetermined temperature coefficient.

21. The displacement transducer according to claim 20 further comprising a hollow housing for containing said transducer, said housing fabricated from the same type of material as said rods.

22. The transducer according to claim 1 wherein certain of said wafers are fabricated from an electrostatic shielding material to provide shielding between adjacent wafers.

* * * * *